Nov. 22, 1927.  
W. L. GASS  
VEHICLE HOIST  
Filed Feb. 7, 1925  
1,650,438  
4 Sheets-Sheet 3

INVENTOR  
William L. Gass  
ATTORNEYS

Nov. 22, 1927.
W. L. GASS
1,650,438
VEHICLE HOIST
Filed Feb. 7, 1925    4 Sheets-Sheet 4
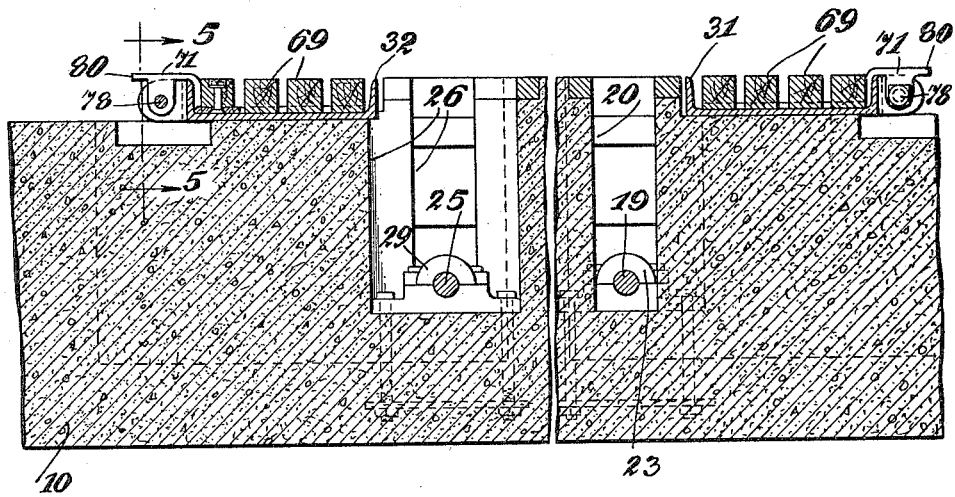
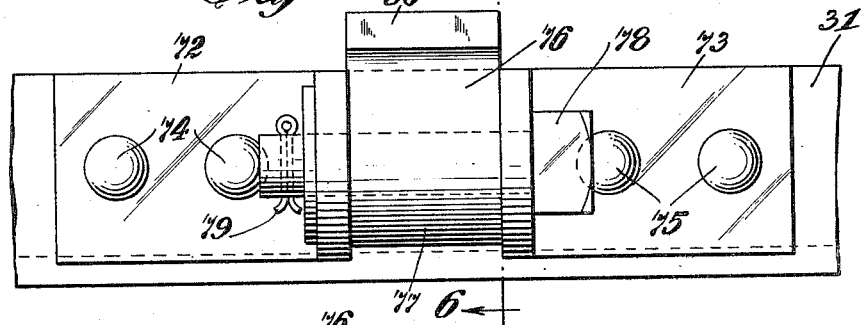
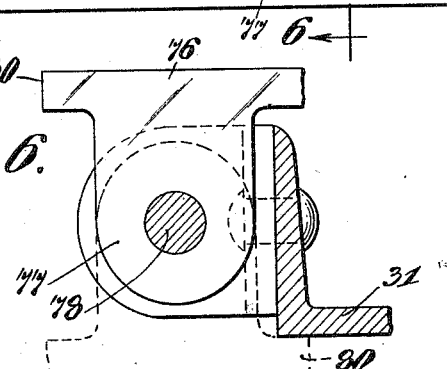
INVENTOR
William L. Gass Patented Nov. 22, 1927.

1,650,438

UNITED STATES PATENT OFFICE.

WILLIAM L. GASS, OF BROOKLYN, NEW YORK, ASSIGNOR TO COLUMBIA MACHINE WORKS & MALLEABLE IRON CO., OF BROOKLYN, NEW YORK, A CORPORATION OF NEW YORK.

VEHICLE HOIST.

Application filed February 7, 1925. Serial No. 7,467.

This invention relates to an improvement in vehicle hoists, and the object thereof is the provision of an apparatus for elevating vehicles in order to gain ready access to the driving and other mechanism thereof for the purposes of repair and otherwise, and in so doing to provide a grating or platform which normally assumes a position in runways for receiving the wheels of a vehicle and directing the same, and which grating may be swung or otherwise placed in a position to constitute a support or platform for a workman, or to provide a means for supporting a sling beneath the vehicle to maintain a platform in position for working upon beneath the vehicle.

In carrying out the invention the apparatus is one which is simply and inexpensively constructed and preferably comprises a rail or channel or a set of the same to function as runways for the vehicle wheels and which are mounted upon spindles adapted to be raised and lowered by suitable mechanism so as to make it possible to place a vehicle upon the runways and to elevate the same to any desired height within the limits of the apparatus. In carrying out the invention, as hereinbefore stated, I also employ a grating or a series of gratings adapted normally to fit within the channels or runways and when a vehicle is moved into the runways to elevate the same these gratings may be moved to a position outside of the runways and in which the same function as a platform or support for the workman or mechanic, making it easier to gain access to the under parts of the vehicle than would otherwise be the case.

The invention will be hereinafter more particularly described in connection with the accompanying drawings in which,—

Fig. 4 is also an enlarged cross section taken on the line 4—4, Fig. 1.

Fig. 5 is an enlarged side elevation showing the manner in which the platform gratings are connected to the channel rails, and Fig. 6 is a section on line 6—6, Fig. 5.

Figure 1:
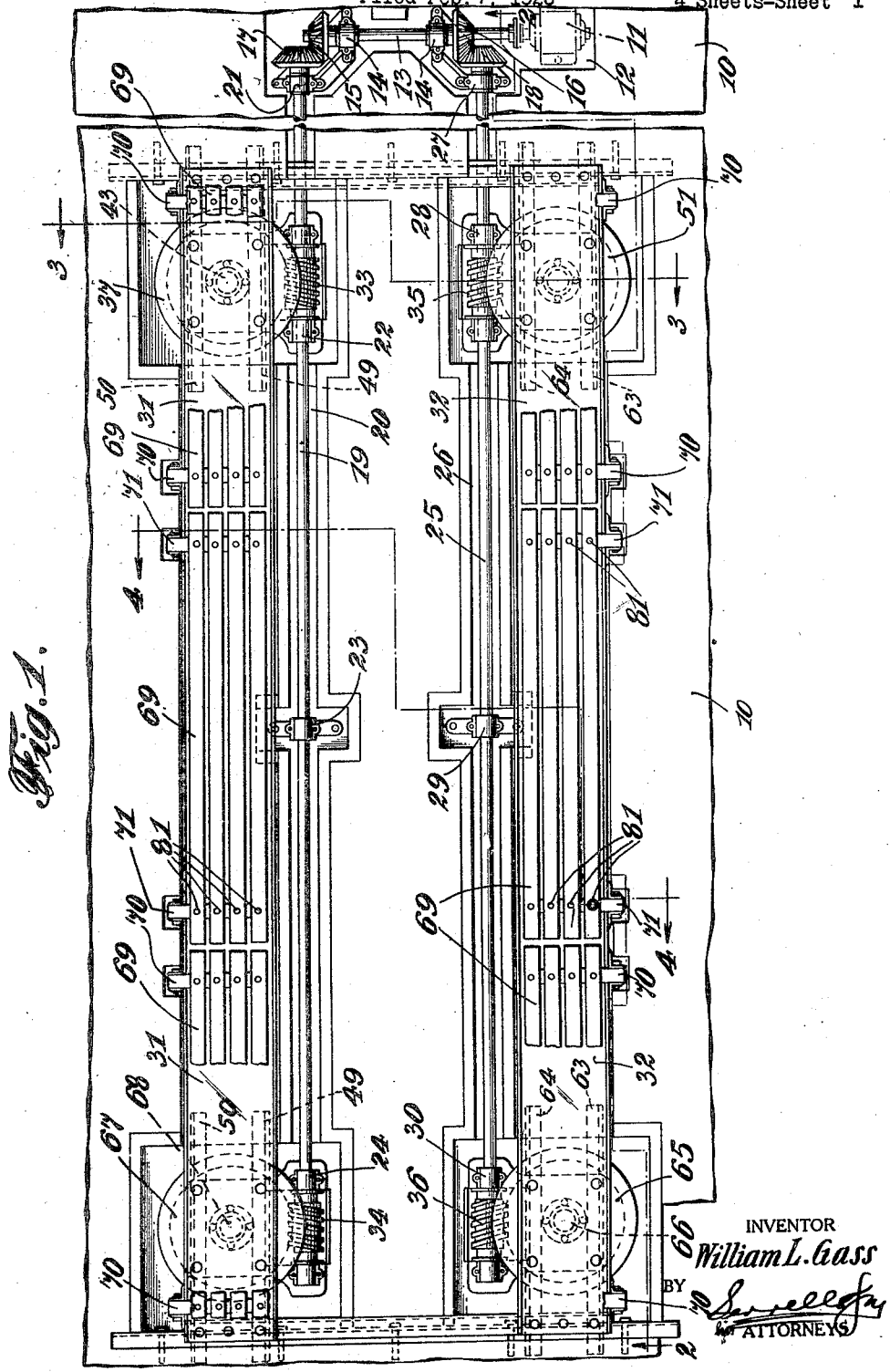
Fig. 1 is a plan of a vehicle hoist made in accordance with this invention.
Figure 2:
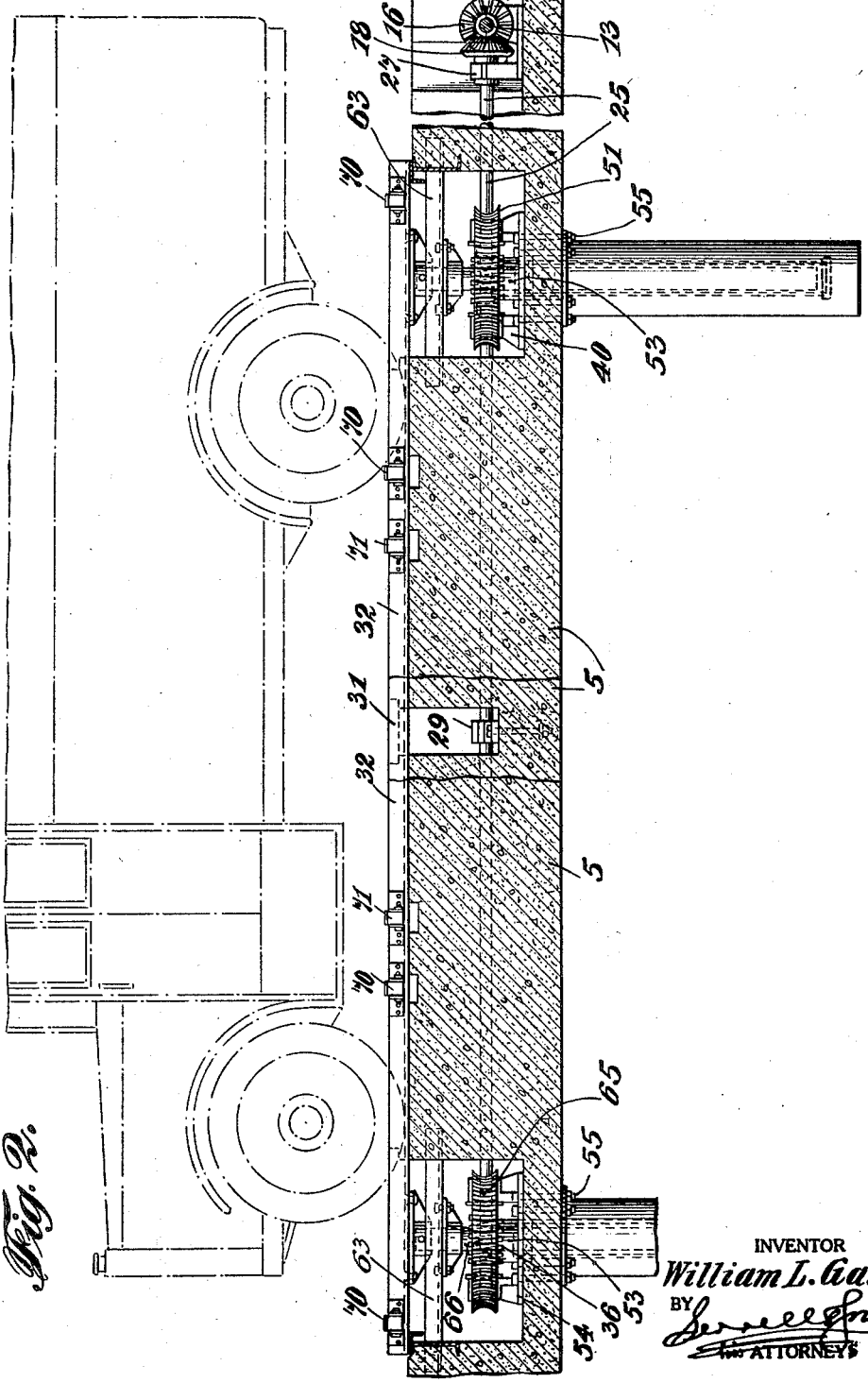
Fig. 2 is a sectional elevation on line 2—2, Fig. 1.

In carrying out the invention the apparatus is preferably built into the floor or foundation of a garage, a shop or other place in which it is customary to repair vehicles, and the upper portions of the vertically movable members of the apparatus when in their normal positions are preferably made to complete the continuity of the floor level so that when not in use the apparatus in no way interferes with moving vehicles or other devices across the floor. As will be seen by referring to these drawings, in carrying out the invention the operative parts thereof are mounted in a suitable foundation indicated at 10. In order to operate the apparatus I preferably employ a motor 11 which is fixed on a base 12 forming part of or supported upon the foundation 10. The motor shaft is connected to a drive shaft 13 by means of a suitable clutch or otherwise, and this drive shaft is journaled in bearings 14. Secured on the drive shaft 13 are bevel gears 15, 16. The bevel gear 15 meshes with a bevel gear 17, and the bevel gear 16 with a bevel gear 18. The bevel gear 17 is carried by a shaft 19 which extends through a trough 20 provided therefor in a foundation or floor, and the shaft 19 is journaled in suitable bearings indicated at 21, 22, 23 and 24. In a similar manner the bevel gear 18 is mounted on a shaft 25 which extends through a trough 26 provided therefor in the foundation, and this shaft 25 is journaled in bearings 27, 28, 29 and 30.

In carrying out the invention these shafts and gears driven by the motor are employed to raise and lower one or more channel irons into and upon which a vehicle is run. As illustrated, the mechanism is constructed to include two such channel irons, one for the wheels on one side of a vehicle and the other for the wheels on the other side of the vehicle. Obviously, however, a single platform or its equivalent, or a greater number thereof may be used without departing from the nature and spirit of the invention. As illustrated, however, the channel irons are indicated at 31 and 32, and as hereinbefore stated these are employed as runways for the wheels of a vehicle which it is desired to elevate.

Mounted on the shaft 19 there are worms 33 and 34 and similarly on the shaft 25 there are worms 35 and 36. The worm 33 meshes with a worm gear 37 which is provided with a hub 38 suitably mounted in a bearing 39 carried by a base 40 and secured by means of bolts 41 or otherwise at the bottom of a pit 42 provided therefor in the foundation. The hub 38 of the worm gear 37 is provided interiorly with a screw thread to receive the screw threaded portion of a spindle 43 which extends therethrough and normally into a well 44 which as illustrated may be provided with a sleeve or liner 45. At its upper end the screw spindle 43 is connected to the bracket 46 to which in any suitable manner the channel iron 31 is connected. As illustrated, the upper end of the screw spindle is connected to the bracket 46 by means of a pin 47, but as will be understood this connection may be made in any suitable manner. Within the pit 42 I prefer to employ a bearing 48 for this screw spindle 43. This bearing may be mounted in any suitable manner. As illustrated, however, it is secured in position by means of angle irons 49 and 50 which extend across the pit and are mounted at the ends thereof in the walls forming the foundation or otherwise.

In a similar manner and at this motor end of the apparatus the worm 35 meshes with a worm gear 51 and this worm gear 51 is fitted with a hub 52 mounted in a bearing 53 which is carried by a base 54 and secured in position by means of bolts 55 or otherwise in a pit 56 provided for this purpose. A screw spindle 57 passes through the hub 52 of the worm gear 51 and normally lies within a well 58 provided for this purpose and which is preferably fitted with a liner 59 in a similar manner as that in which the liner 45 is employed in the well 44. At the upper end thereof the screw spindle 57 is connected to a bracket 60 by means of a pin 61 or otherwise, and in a suitable manner the bracket 60 is connected to the channel rail 32 forming the other runway of the apparatus. In the pit 56 I also provide a bearing 62 for the screw spindle 57 and this bearing 62 as illustrated is secured in position by angle irons 63 and 64 extending across the pit and fixed at their ends in the walls of the foundation.

At the other end of the apparatus the worm 36 meshes with a worm gear 65 which operates a screw spindle 66 by a mechanism in all ways similar to those hereinbefore described, and likewise at the other end of the shaft 19 the worm 34 thereon meshes with a worm gear 67 which in like manner operates a screw spindle 68, it being understood that the screw spindles 66 and 68 are connected at their upper ends to the channels 32 and 31 respectively in the same or an equivalent manner to that in which the screw spindles 43 and 57 are connected thereto.

Figure 3:
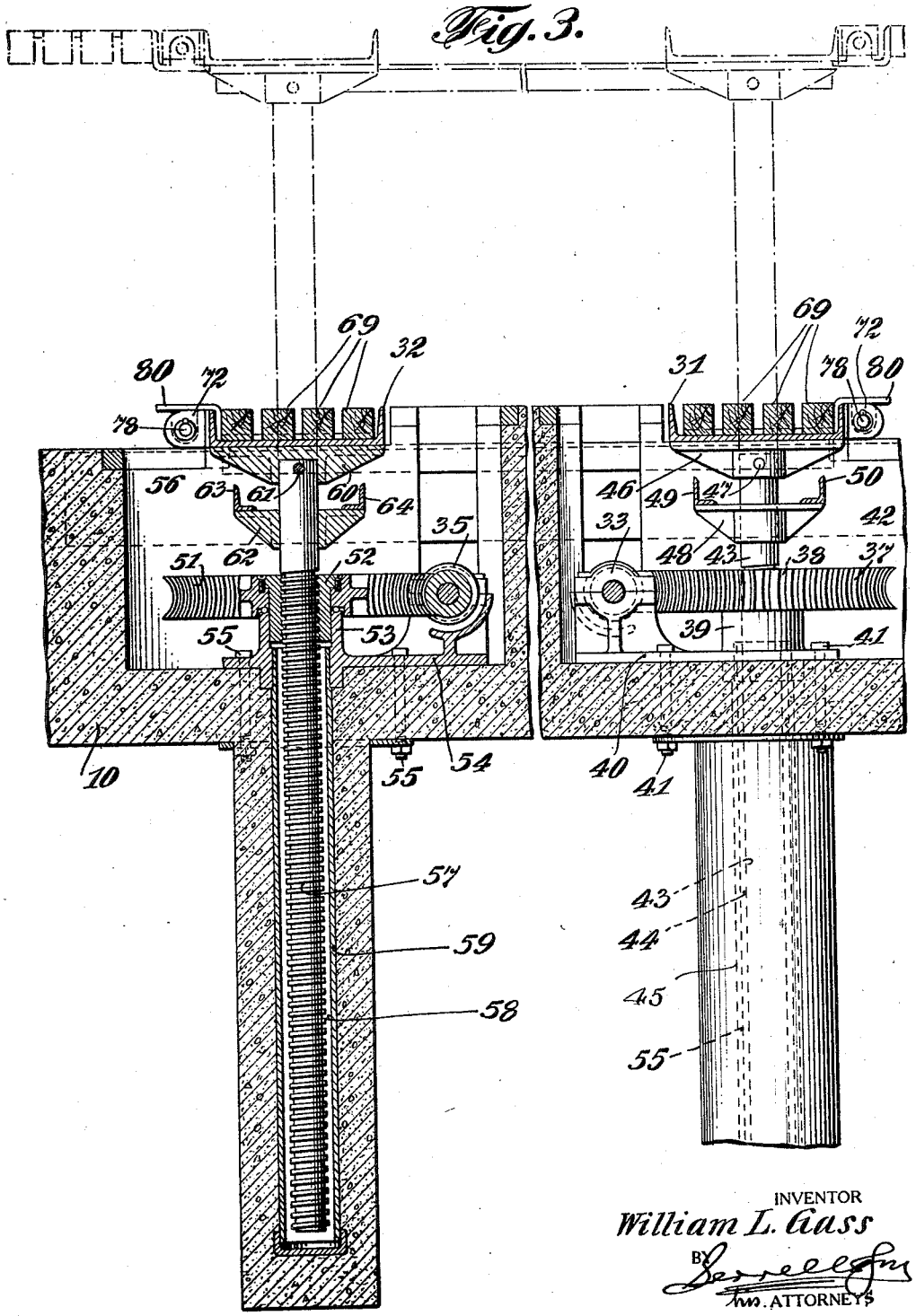
Fig. 3 is an enlarged cross section on line 3—3, Fig. 1.

When in their normal positions the upper edges of the flanges of the channel irons or runways are substantially flush or on the same level with the floor of the garage or shop in which the apparatus is installed, and normally in order to complete the continuity of the floor under ordinary circumstances I employ a plurality of gratings which include slats or stringers 69 and cross arms to which the same are connected. These cross arms, as hereinafter described, preferably comprise hinge arms for swinging the gratings into and out of their normal positions. It will be understood that any desired number of these gratings may be employed in each of the runways, and as they are all similarly mounted the mounting of but one of the gratings will be specifically described. Each of these gratings is preferably hingedly mounted to the outer flange of a channel iron or runway, and referring to the centrally disposed grating as illustrated in the channel iron 31 in Fig. 1, the hinges are designated at 70 and 71. Each of these hinges, as will be seen by reference to Fig. 6, preferably comprises brackets 72 and 73 which may be secured to the outer face of the flange of the runway channel by rivets 74, 75 or otherwise and a hinge bar 76 which is provided with a lug 77 fitting between the brackets 72 and 73 and connected thereto by a bolt 78 or otherwise, the bolt 78 being maintained in place to keep the parts in position by means of a cotter 79 or otherwise. As indicated in these figures of the drawing the hinge bar 76 is provided with an extension 80 and the slats or stringers 69 are connected to the hinge bars by rivets or screws indicated at 81. As shown in the drawing, the extension 80 of each hinge bar overlies the brackets when the gratings are within the channel irons or runways and the gratings are made to complete the continuity of the floor by being level therewith. Also as shown, for example, in Fig. 3 of the drawing these gratings may be swung on the hinges to the positions shown in dotted lines in Fig. 3 so that when the hoist is raised to elevate a bus or other vehicle these gratings form laterally disposed supports which may be used as platforms or seats or otherwise by the workmen to facilitate access to the parts of the raised vehicle, and in this position the construction of the extension 80 abuts against the under side of the channel or runway in order to adequately support the grating for this purpose.

I claim as my invention:

1. In a vehicle hoist, a runway formed by a channel, a grating adapted normally to lie within and to substantially fill the space in the channel with the then upper face of the runway at substantially the same level as the top of the sides of the channel to form an even surface, and means for connecting the grating to the runway so as to be moved therefrom and supported thereby in a position at substantially 180° from its normal position when in place within the channel.

2. In a vehicle hoist, a runway formed by a channel, a grating adapted normally to lie within and to substantially fill the space in the channel with the then upper face of the runway at substantially the same level as the top of the sides of the channel to form an even surface, and hinges for connecting the grating to the runway so that the grating may be swung from its normal position in the runway to a position exteriorly of the runway and at substantially 180° from its normal position, each hinge being provided with an extension for engaging the runway when the grating is swung exteriorly thereof so as to support the grating in place exteriorly of the runway.

3. In a vehicle hoist, a runway formed by a channel, a grating adapted normally to lie within and to substantially fill the space in the channel with the then upper face of the runway at substantially the same level as the top of the sides of the channel to form an even surface, means for connecting the grating to the runway so as to be moved therefrom and supported thereby in a position at substantially 180° from its normal position when in place within the channel, and means for raising and lowering the said channel.

4. In a vehicle hoist, a runway formed by a channel, a grating adapted normally to lie within and to substantially fill the space in the channel with the then upper face of the runway at substantially the same level as the top of the sides of the channel to form an even surface, hinges for connecting the grating to the runway so that the grating may be swung from its normal position in the runway to a position exteriorly of the runway and at substantially 180° from its normal position, each hinge being provided with an extension for engaging the runway when the grating is swung exteriorly thereof so as to support the grating in place exteriorly of the runway, and means for raising and lowering the said channel.

5. In a vehicle hoist, a set of spaced runways formed by channels, a grating associated with each channel and normally adapted to lie within the same to substantially fill the space in the channel with the then upper face of the runway at substantially the same level as the tops of the sides of the channel to provide an even surface, and sets of hinges, each set of hinges connecting a channel with its grating so that the grating may be swung from its initial position in the channel to a position exterior thereof and at substantially 180° from its normal position with each hinge having a projection for engaging the channel to support the grating when moved to position exteriorly of the channel.

Signed by me this 5th day of Dec., 1924.

WILLIAM L. GASS.